United States Patent
Teo et al.

(10) Patent No.: US 6,693,756 B2
(45) Date of Patent: Feb. 17, 2004

(54) REDUCING READ ELEMENT POWER DISSIPATION LEVELS IN A DISC DRIVE

(75) Inventors: Hweepeng Teo, Singapore (SG); Myint Ngwe, Singapore (SG); BengTheam Ko, Singapore (SG); FongKheon Chong, Singapore (SG); Kah Liang Gan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 338 days.

(21) Appl. No.: 09/894,329

(22) Filed: Jun. 27, 2001

(65) Prior Publication Data

US 2002/0036857 A1 Mar. 28, 2002

Related U.S. Application Data

(60) Provisional application No. 60/236,321, filed on Sep. 28, 2000.

(51) Int. Cl.[7] .................................................. G11B 5/03
(52) U.S. Cl. ........................................... 360/66; 360/46
(58) Field of Search ............................... 360/46, 66, 61, 360/62, 63, 53, 75, 31

(56) References Cited

U.S. PATENT DOCUMENTS

| | | |
|---|---|---|
| 5,309,295 A | 5/1994 | Bailey et al. |
| 5,412,518 A | 5/1995 | Christner et al. |
| 5,459,757 A | 10/1995 | Minuhin et al. |
| 5,508,867 A | 4/1996 | Cain et al. |
| 5,615,063 A | 3/1997 | Kuroki et al. |
| 5,790,331 A | 8/1998 | Aranovsky |
| 5,877,911 A | 3/1999 | Klaassen et al. |
| 5,880,912 A | 3/1999 | Rottmayer |

*Primary Examiner*—David Hudspeth
*Assistant Examiner*—Glenda P Rodriguez
(74) *Attorney, Agent, or Firm*—Fellers, Snider, et al.

(57) ABSTRACT

Apparatus and method for transferring data in a disc drive data handling system. A read/write head having separate write and read elements is used to write data to and transduce data from a disc recording surface. A preamplifier driver circuit applies write currents to the write element to write data to the recording surface and to apply a first read bias signal of selected, nonzero magnitude to the read element to transduce data from the recording surface. In response to the assertion of a write gate signal, the preamplifier driver circuit generates a second read bias signal of selected, nonzero magnitude and applies the second read bias signal to the read element while applying the write currents to the write element. This reduces the potential for damage to the read element due to cross-talk noise induced in the read bias signal from magnetic coupling between the read and write elements.

18 Claims, 7 Drawing Sheets

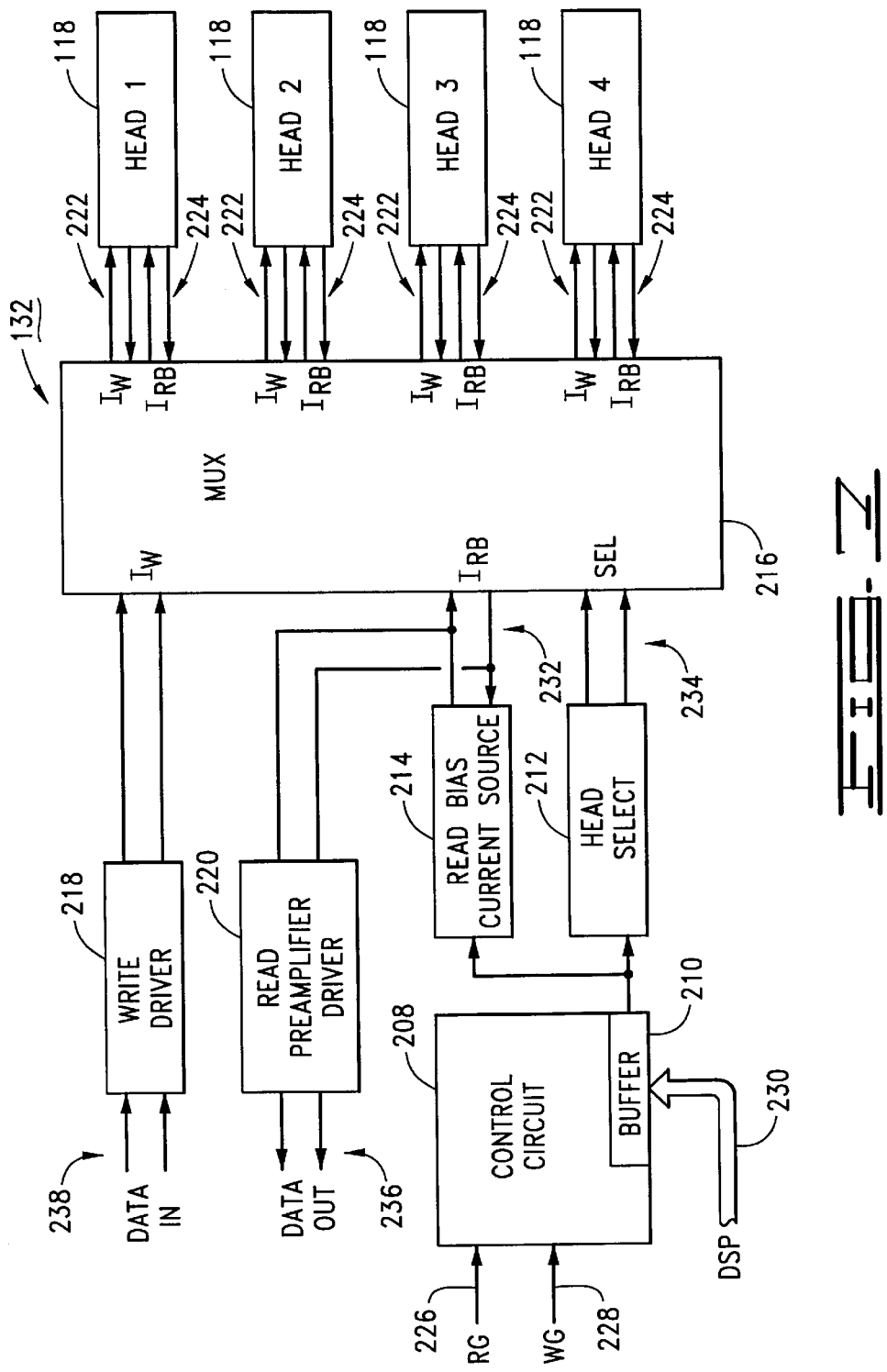

REDUCING READ ELEMENT POWER DISSIPATION LEVELS IN A DISC DRIVE

RELATED APPLICATIONS

This application claims priority to Provisional Application No. 60/236,321 filed Sep. 28, 2000.

FIELD THE INVENTION

This invention relates generally to the field of disc drive data handling systems, and more particularly, but not by way of limitation, to a method and apparatus for reducing read element power dissipation during a disc drive write operation to improve operational life of the read element.

BACKGROUND

Disc drives are data handling systems used to magnetically store and retrieve digital data files. A typical disc drive comprises one or more rigid recording storage discs arranged about a spindle motor for rotation at a constant high speed. A corresponding array of read/write heads are provided to transfer data between tracks defined on the disc surfaces and a host device (such as a computer) in which the disc drive is mounted. The heads are mounted to a rotary actuator and are controllably positioned adjacent the tracks through the application of current to an actuator motor (such as a voice coil motor, VCM).

Present generation disc drives typically employ heads which utilize separate read and write elements. The write element typically has a thin-film inductive coil construction with a write gap placed in close proximity to the recording medium. Input data to be written to a disc are encoded and serialized to generate a series of bi-directional write currents which are applied to the write element. Each change in the polarity of the write current results in a magnetic flux reversal, or flux transition, in the recording medium. Data are thus recorded along each track at a selected frequency in relation to the presence of a flux transition (a logical 1) or the absence of a flux transition (a logical 0) at regular intervals along the track.

The read element is provided from a magneto-resistive (MR) material which is configured to exhibit changed electrical characteristics when subjected to a magnetic field of a selected orientation. During a read operation, the read element is biased using a relatively small bias current (or bias voltage), and the selective magnetization of the disc is detected in relation to induced changes in voltage across (or current through) the read element caused by the magnetization pattern along the track.

MR read elements typically have a semiconductor construction with very thin internal boundary areas and are thus extremely delicate and easily damaged. It is important to not stress a read element by dissipating too much power through the element, as such stress over time may lead to degraded performance and reduced operational life. The power rating of a read element provides an upper limit on the maximum read bias current magnitude that should be applied to the element during operation.

Disc drive manufacturers attempt to select appropriate read bias current magnitudes for each head that are well within the maximum limits that the heads can safely handle, and take steps to ensure that such limits are not exceeded during operation. For example, U.S. Pat. No. 6,141,165 issued to Nguyen et al. discloses a head switching operation in which a disc drive switches from a presently selected MR head to a target MR head. When the target head uses a larger bias current than the presently selected head, the drive switches to the target head and then increases the bias current. Contrawise, when the target head uses a smaller bias current than the presently selected head, the bias current applied to the presently selected head is reduced and then the drive switches to the target head. In this way, even temporary overstress conditions in either the presently selected head or the target head are eliminated.

While these and other prior art methodologies have been found to advantageously reduce the possibility of overstressing MR read elements, there are still conditions that may be encountered during drive operation that can lead to an overstress condition. With the continuing trend of providing disc drives with ever greater levels of data storage and data rate capabilities, it is contemplated that future generation heads will have ever increasing levels of reader sensitivity and will thus be even more prone to damage from overstress conditions. There is therefore a continued need for improvements in the art whereby such overstress conditions can be reduced or avoided, and it is to such improvements that the present invention is directed.

SUMMARY OF THE INVENTION

The present invention is directed to an apparatus and method for transferring data between a recording surface of a disc drive data handling system and a host device.

In accordance with preferred embodiments, the disc drive data handling system includes a disc having a data recording surface, and a read/write head having separate write and read elements used to write data to and transduce data from the recording surface. A communication channel is provided to direct the transfer of data between the recording surface and a host device, with the communication channel asserting a write gate signal in preparation of the writing of data.

A preamplifier driver circuit is configured to apply write currents to the write element to write data to the recording surface and to apply a first read bias signal of selected, nonzero magnitude to the read element to transduce data from the recording surface. In response to the write gate signal, the preamplifier driver circuit generates a second read bias signal of selected, nonzero magnitude different from the magnitude of the first read bias signal and applies the second read bias signal to the read element while applying the write currents to the write element. Upon deassertion of the write gate signal, the preamplifier driver circuit subsequently reapplies the first read bias signal to the read element to subsequently read data from the recording surface. Preferably, the first and second read bias signals comprise first and second read bias currents, respectively.

Moreover, the disc drive data handling system further comprises a servo circuit which controls the position of the read/write head in response to servo data stored in servo data fields on tracks on the recording surface. User data are written to user data fields interspersed between adjacent servo data fields. Thus, during a write operation in which user data are written to the user data fields, the preamplifier driver circuit applies the first read bias signal to the read element when the read/write head is disposed over the servo data fields, and applies the second read bias signal to the read element when the read/write head is disposed over the user data fields.

By reducing the read bias signal levels during the writing of data, the potential for damage due to cross-talk noise induced in the second read bias signal from magnetic coupling of the write element with the read element is greatly reduced.

These and various other features and advantages which characterize the present invention will be apparent from a reading of the following detailed description and a review of the associated drawings.

BRIEF DESCRIPTION OF THE DRAWINGS

FIG. 6 is a generalized timing diagram to illustrate how such magnetic coupling is compensated by reducing the bias level of the read element of a head during a write operation in accordance with preferred embodiments.

FIG. 7 is a functional block diagram of a preamplifier driver circuit of the disc drive of FIG. 1 constructed in accordance with preferred embodiments.

FIG. 9 is a flow chart for a DATA TRANSFER routine generally illustrative of steps carried out in accordance with preferred embodiments to reduce the bias level of a read element during a write operation.

DETAILED DESCRIPTION

Figure 1:
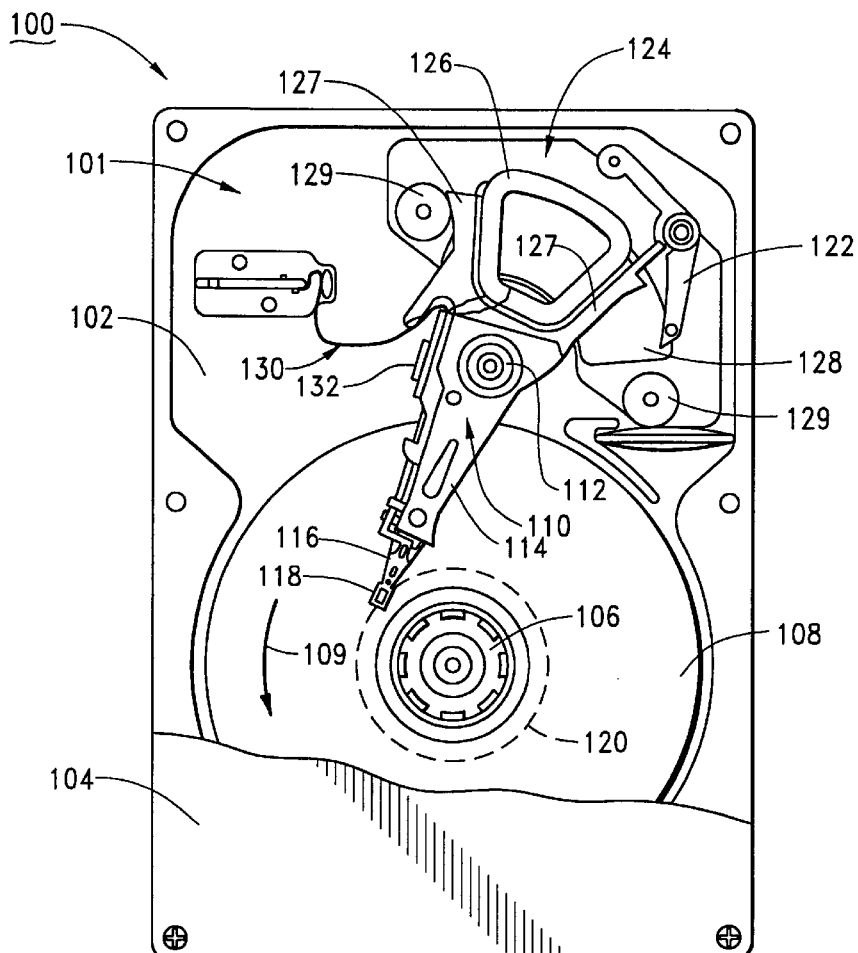
FIG. 1 is a top plan view of a disc drive data handling system (disc drive) constructed in accordance with preferred embodiments of the present invention.

Referring to the drawings in general, and more particularly to FIG. 1, shown therein is a top plan view of a disc drive data handling system 100 (hereinafter "disc drive") constructed in accordance with preferred embodiments of the present invention. It will be understood that the disc drive 100 is provided for purposes of illustration and numerous variations in construction and operation can readily be employed.

The disc drive 100 includes a head-disc assembly (HDA) 101 which houses various mechanical components of the disc drive 100, and a disc drive printed circuit board assembly (PCBA) which supports various electronic communication and control circuits of the drive. The PCBA is affixed to the underside of the HDA 101 and is therefore not visible in FIG. 1.

The HDA 101 includes a base deck 102 which, in cooperation with a top cover 104 (shown in partial cut-away), forms an internal housing for the disc drive 100. A spindle motor 106 is supported within the housing to rotate a number of recording discs 108 in an angular direction indicated at 109.

An actuator 110 is provided adjacent the discs 108 and rotates about a cartridge bearing assembly 112 mounted to the base deck 102. The actuator 110 includes a number of rigid actuator arms 114 from which flexible suspensions (flexures) 116 extend. The distal end of each flexure 116 supports a read/write transducing head 118.

The heads 118 incorporate aerodynamic features which allow the heads to be supported over the corresponding disc surfaces while the discs 108 are rotated. When the disc drive is deactivated, the heads 118 are brought to rest upon texturized landing zones 120 near the innermost diameters of the discs 108. A magnetic latch 122 secures the actuator 110 in this position.

A voice coil motor (VCM) 124 is used to rotate the actuator 110 about the cartridge bearing assembly 112. The VCM 124 includes an actuator coil 126 supported by coil support arms 127 which project from the actuator 110. The coil is immersed in a magnetic field produced by a pair of permanent magnets (the bottom of which is shown at 128). The heads 118 are moved across the disc surfaces through the controlled application of current to the coil 126. End stops 129 limit the radial extent of travel of the actuator 110.

A flex circuit assembly 130 provides electrical communication paths between the actuator 110 and the disc drive PCBA. The flex circuit assembly 130 includes a preamplifier driver circuit 132 mounted to the side of the actuator 110. As discussed in greater detail below, the preamplifier driver circuit 132 (preamp) provides write and read bias currents to the heads and preamplifies readback signals from the heads during data transfer operations.

Figure 2:
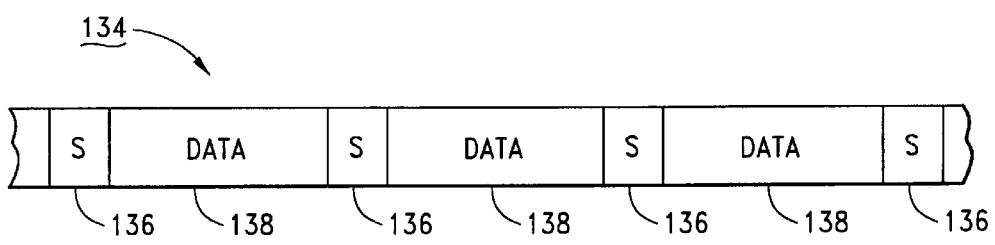
FIG. 2 shows the conventional format for a selected track on which both servo data and user data are stored in respective servo data fields and user data fields in accordance with the prior art.

The disc drive 100 is contemplated as using a conventional embedded servo scheme, as illustrated by FIG. 2. More particularly, FIG. 2 shows a portion of a selected track 134 from a selected disc surface. Servo data fields 136 store servo data used to control head position, and are written during disc drive manufacturing. User data fields 138 are formed in the areas between adjacent servo data fields 136 during a disc drive formatting operation and are used to store user data from a host device.

Figure 3:
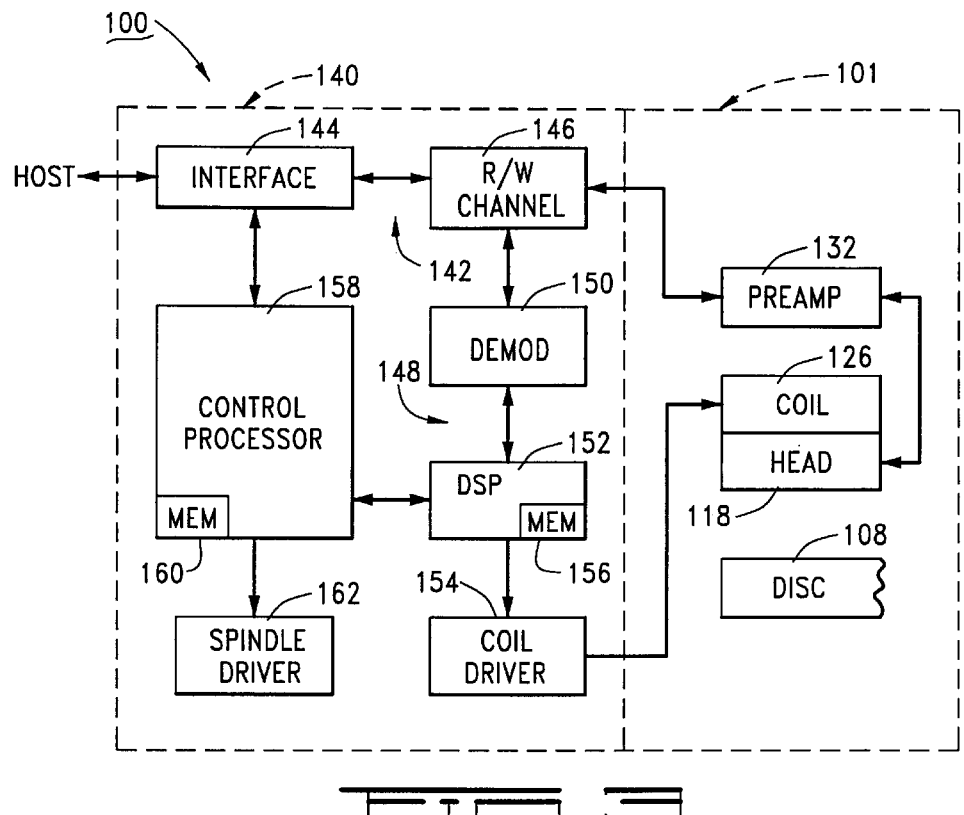
FIG. 3 is a functional block diagram of the disc drive of FIG. 1.

FIG. 3 provides a functional block diagram of the disc drive 100 of FIG. 1 and illustrates various electronic systems on the aforementioned disc drive PCBA (numerically denoted at 140).

A communication channel 142 operates to transfer data between the discs 108 and the host device (such as a personal computer, not shown). The communication channel 142 includes an interface circuit 144 and a read/write (R/W) channel 146. The interface circuit 144 includes a data buffer to temporarily store input and output data, and a sequencer which directs the operation of the R/W channel 146 during reading and writing operations. The R/W channel 146 includes a write channel which encodes and serializes input data to be written to the user data fields 138, and a read channel which reconstructs output data transduced from the user data fields 138.

A closed-loop digital servo circuit 148 provides closed loop head positional control. The servo circuit 148 includes a demodulator (demod) 150, a digital signal processor (DSP) 152 and a coil driver circuit 154. The demod 150 conditions the servo data transduced from the servo data fields 136. The DSP 152 processes the servo data to identify the location of a selected track with respect to the disc surface, and generates a position error signal (PES) indicative of position error. The DSP 152 further outputs digital current command signals to the coil driver 154 to adjust the position of the selected head 118, and the coil driver 154 applies current to the coil 126 in response to the current command signals from the DSP 152.

It will be noted that in an embedded servo scheme as represented by the format of FIG. 2, servo data are only periodically available for use by the servo circuit 148 (i.e., only at times when the head 118 is over the servo data fields 136). This sampling rate is typically insufficient to maintain the head 118 over the selected track when the head 118 is over the user data fields 138 between adjacent servo fields 136. Accordingly, the DSP 152 generates estimates of head position and velocity at times when the selected head 118 is over the user data fields 138 and outputs current command signals based on these estimates. In this way, head position adjustments are made at a sufficient rate to maintain the head in a proper relation to the track being followed.

The DSP 152 operates in accordance with programming stored in DSP memory (MEM) 156, as well as in response to commands from a top level processor 158. The top level processor 158 directs overall disc drive operation and operates in accordance with programming in processor memory 160, as well in response to commands issued by the host device. A spindle driver circuit 162 controls the rotation of the spindle motor 106 (FIG. 1) in response to commands from the top level processor 158.

Figure 4:
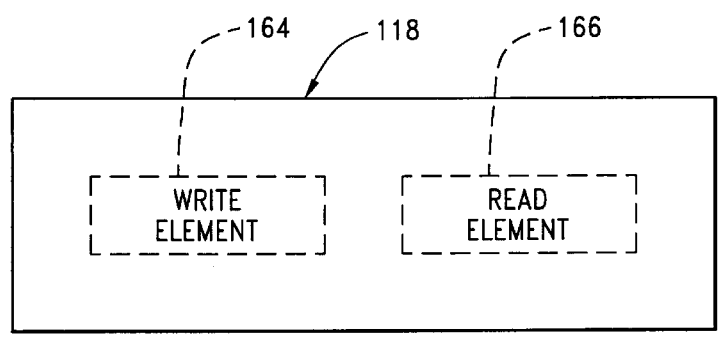
FIG. 4 shows the general construction of each head of the disc drive to include separate read and write elements in accordance with the prior art.
Figure 3:
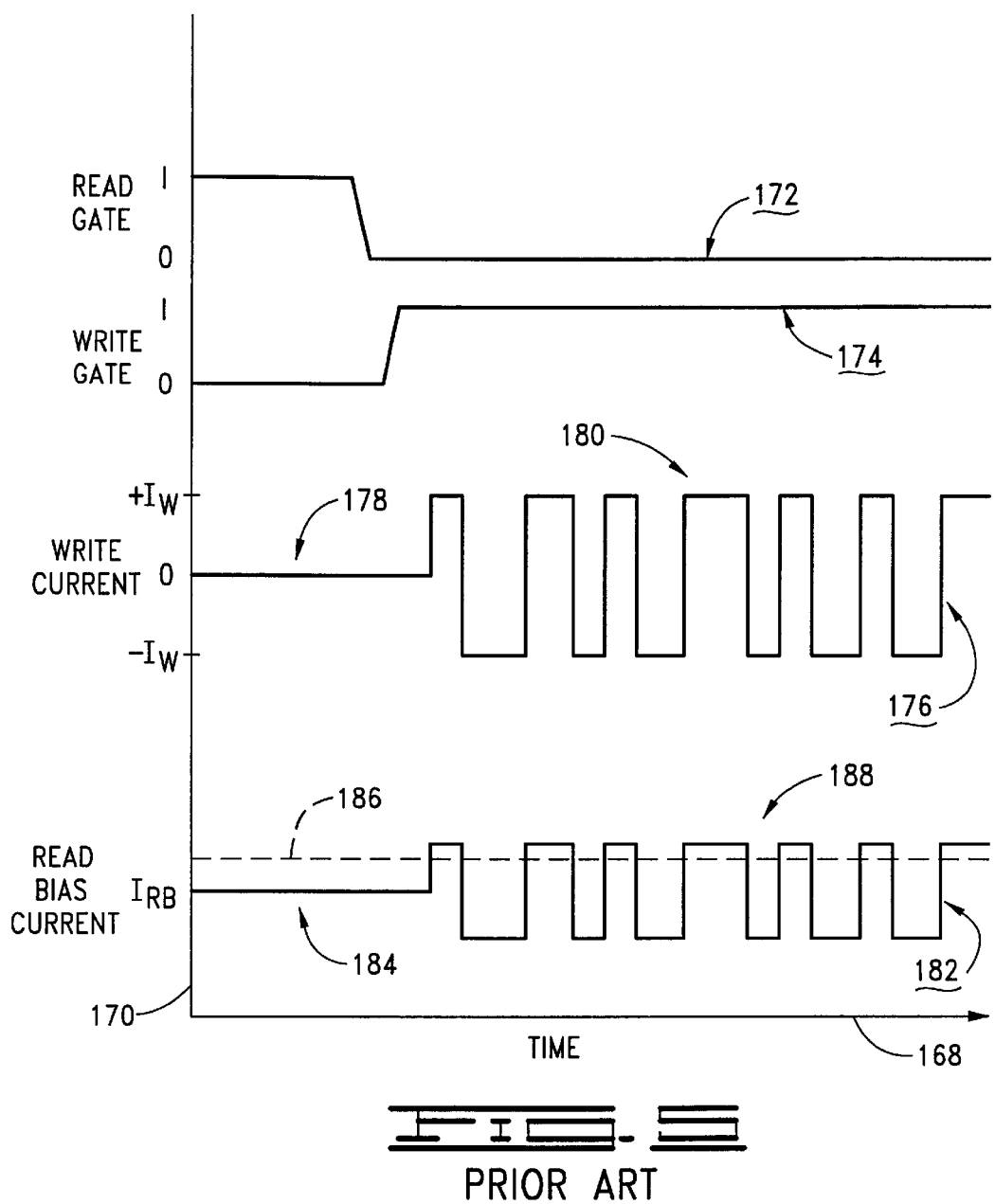

Each head 118 comprises separate write and read elements 164, 166, as represented in FIG. 4. Preferably, each head has a conventional magneto-resistive (MR) construction, although other constructions can readily be used. The write element 164 preferably comprises a thin-film inductive coil with a write gap. Data are written by the application of bi-directional write currents to the write element 164 by the preamp 132.

The read element 166 preferably comprises a magneto-resistive element that undergoes a change in electrical characteristics when subjected to a magnetic field of a selected orientation. During a read operation, the preamp 132 biases the read element 166 and generates a readback signal in relation to changes in voltage across (or current through) the read element 166 as the element passes over the selective magnetization of a track.

Figure 5:
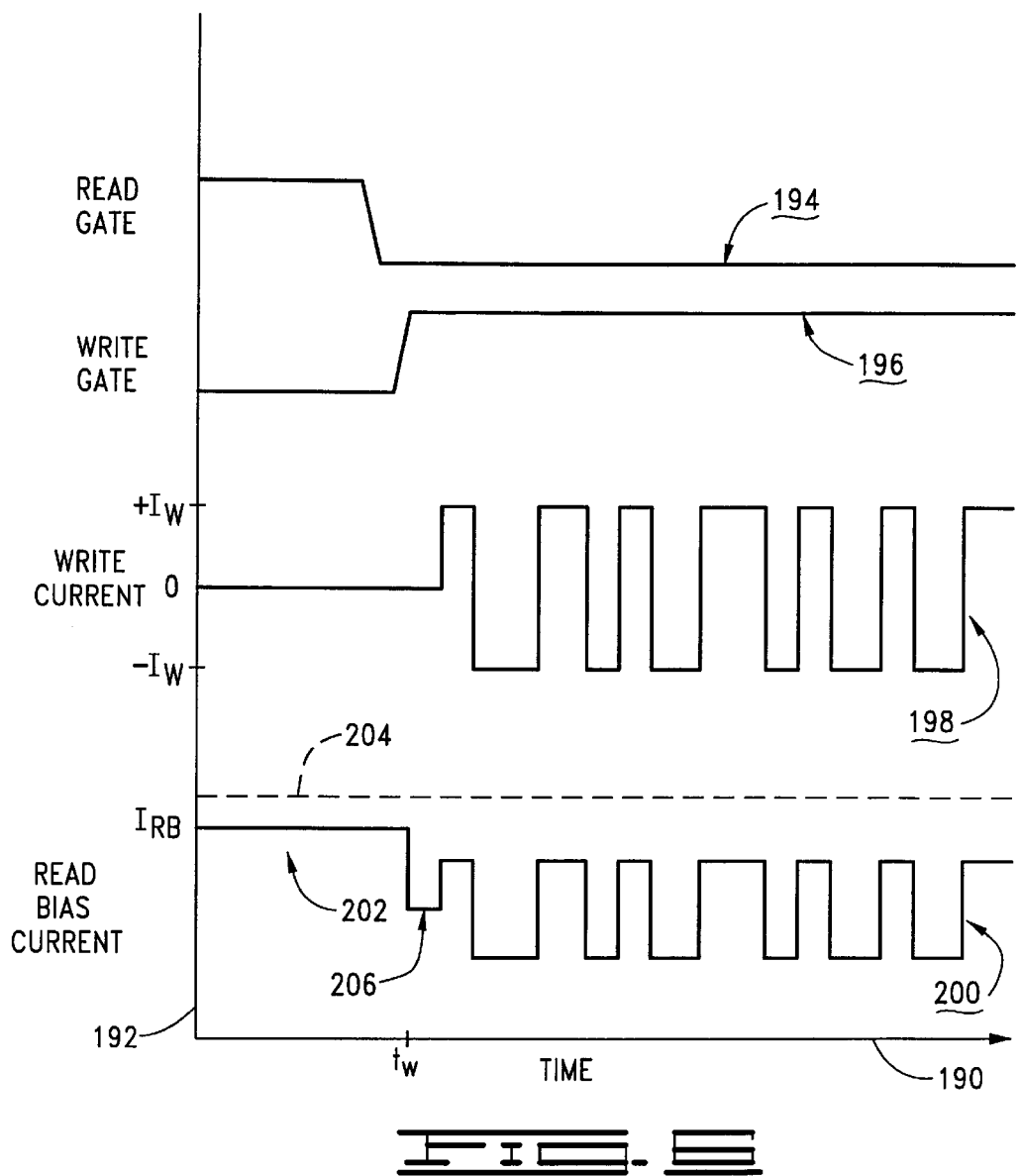
FIG. 5 is a generalized timing diagram to illustrate how magnetic coupling between the read and write elements of a head can undesirably increase the power dissipation in the read element of a prior art disc drive.

FIG. 5 provides a generalized timing diagram to illustrate the manner in which data are typically transferred in a disc drive configured and operated in accordance with the prior art. The timing diagram includes a number of timing signals plotted against an elapsed time x-axis 168 and a common y-axis 170.

Read gate and write gate signals are represented at 172, 174, respectively, and are generated by the sequencer of an interface circuit (such as the circuit 144 in FIG. 3) to enable the reading and writing of data. The read gate and write gate signals 172, 174 are shown to be bi-state, enabled-high logical signals. Reading is enabled when the read gate signal 172 is at a high logical state (logical 1) and writing is enabled when the write gate signal 174 is at a high logical state (logical 1). Of course, other read gate and write gate signal configurations are commonly employed in the art, such as the use of a single R/W signal that takes one logical state (such as logical 1) to assert a read operation and the other logical state (such as logical 0) to assert a write operation. However, it will be understood that the diagram of FIG. 5 is provided merely for purposes of illustration and the configuration of the read gate and write gate signals is not particularly germane to the present invention.

A write current signal is shown at 176. During a read operation and at other times during which data are not written the write current signal 176 takes a nominal baseline value such as zero amps (0 A), as shown by portion 178. When the write gate signal 174 is enabled and input data are to be written, the preamp 132 generates bi-directional write currents that alternate in polarity from magnitudes $+I_W$ and $-I_W$, as shown by portion 180. For reference, typical values of $+I_W$ and $-I_W$ are on the order of about ±50 milliamps ($50 \times 10^{-3}$ A). Each change in current polarity induces a magnetic flux transition along the selected track to which the data are written.

FIG. 5 further shows a read bias signal 182 indicative of the magnitude of read bias current applied to the selected read element. While the present discussion contemplates the read bias signal to comprise a read bias current, it will be readily understood that other types of read bias signals can be used as well, such as read bias voltages. The read bias current is provided at a nominal baseline level as indicated by portion 184 and is preferably selected to be below a maximum safe threshold level, as indicated by broken line 186.

While the write element 164 is essentially "turned on" during write operations and "turned off" during read operations, such is generally not true for the read element 166 in prior art drives that employ an embedded servo scheme. Rather, the read element 166 typically remains "on" during both read and write operations. This is because during a write operation, it is necessary to periodically read the servo data from the servo data fields 136 to maintain the head in a desired relation to the user data fields 138 to which the data are written. Thus, during a typical write operation the write gate signal 174 is asserted when the head is over the user data fields 138, and the read gate signal 172 is asserted when the head is over the servo data fields 136.

It has generally been found impractical to attempt to turn off the read element 166 while data are written to the user data fields 138 and then turn on the read element 166 just before the passage of each servo data field 136. MR read elements require some amount of time to achieve thermal equilibrium before being able to transduce data properly. Thus, most recent prior art disc drive designs leave the read element in a biased state during the entirety of a write operation so that the read element is prepared to read the servo data as the servo data fields 136 are encountered along the track.

A problem thus arises when conditions such as magnetic coupling between the write and read elements 164, 166 induce changes in the bias signal level of the read element 166. The effects of such coupling is illustrated by portion 188 in FIG. 5. Depending upon the particular configuration of a given head, the large changes in write current polarity can induce increases in the read bias current from the nominal value to values above the maximum safe threshold (line 186). This can potentially lead to degraded performance and reduced operational life of the read element 166.

Accordingly, the present invention operates to reduce the potential for damage to read elements 166 by reducing the read bias signal level at times when data are written to the discs 108. FIG. 6 provides a generalized timing diagram to illustrate this operation and includes a number of timing signals plotted against an elapsed time x-axis 190 and a common y-axis 192. FIG. 6 includes read gate and write gate signals 194, 196 and a write current signal 198, which are similar to the corresponding signals shown in FIG. 5. FIG. 6 further illustrates a read bias signal 200 indicative of the bias current applied to a selected read element 166 of the disc drive 100. As before, the read bias current signal 200 has a nominal baseline value at portion 202, which is within a maximum safe threshold level (broken line 204) for the read element. It will be noted that the nominal baseline value at portion 202 is also referred to herein as a "first read bias signal."

However, at such time that the write gate signal 196 is asserted (time $t_W$ on the x-axis 190), the magnitude of the read bias signal is adjusted to a second baseline value, as shown at portion 206. The second baseline value at portion 206 is also referred to herein as a "second read bias signal." The read bias signal is preferably reduced sufficiently to ensure that the maximum current magnitudes induced by the magnetic coupling with the write element 164 remain well within the maximum safe threshold level 204. That is, the read bias signal is preferably reduced so that peak magnitudes of cross-talk noise induced in the second read bias signal from the write currents applied to the write element as a result of magnetic coupling between the write element and the read element do not exceed a maximum safe threshold signal level for the read element.

FIG. 7 provides a functional block diagram for the preamp 132 in conjunction with four heads 118 (respectively identified as HEAD 1–HEAD 4). The preamp 132 includes a control circuit 208 with buffer 210, a head select circuit 212, a read bias current source 214, a multiplexor (mux) circuit 216, a write driver 218 and a read preamplifier driver 220. It will be noted that a set of write conductors 222 and read conductors 224 connect each head 118 to the preamp 132. More specifically, the write conductors 222 are connected to the respective write elements of the heads 118, and the read conductors 224 are connected to the respective read elements of the heads 118. As shown in FIG. 1, these conductors are incorporated into flex-on-suspension (FOS) strips which are routed along the lengths of the actuator arms 114 and flexures 116 (FIG. 1) to the heads 118.

The control circuit 208 provides top level control of the operation of the preamp 132 and receives the read gate (RG) and write gate (WG) signals 194, 196 (FIG. 6) on paths 226 and 228. The buffer 210 is connected via a serial interface path 230 with the DSP 152, which writes multi-bit control words to the buffer to identify which head 118 is to be selected and to identify the nominal baseline value of read bias current for the selected head.

When a new control word is written to the buffer, the read bias current source 214 outputs the appropriate bias current magnitude to the mux 216 on path 232. The head select circuit 212 proceeds to provide selection inputs to the mux 216 on path 234 to enable the appropriate write and read conductors 222, 224 for the selected head 118. For example, if the control word indicates that HEAD 1 is to be selected, the head select circuit 212, read bias current source 214 and the mux 216 will cooperate to generate and transmit the read bias current along path 232, through the mux 216, and along the read conductors 224 to the read element 166 of HEAD 1.

To read data (user data during a read operation or servo data during a read or a write operation), the read preamplifier driver 220 monitors the voltage across the read element 166 of the selected head 118 and outputs an amplified readback signal (DATA OUT) on path 236 to the R/W channel 146 (FIG. 3). To write data, the write driver 218 receives a serialized data stream (DATA IN) on path 238 from the R/W channel 146, and generates and applies the appropriate write currents $I_W$ to the mux 216. The mux 216 in turn transmits the write currents along the appropriate write conductors 222 to the selected head 118 to write the data to the corresponding disc surface.

As discussed above with reference to FIG. 6, the disc drive 100 operates to adjust the read bias level of the read element 166 of the selected head 118 at times when write currents are applied to the write element 164 of the selected head 118. In accordance with preferred embodiments, this is carried out by the read bias current source 214.

Figure 8:
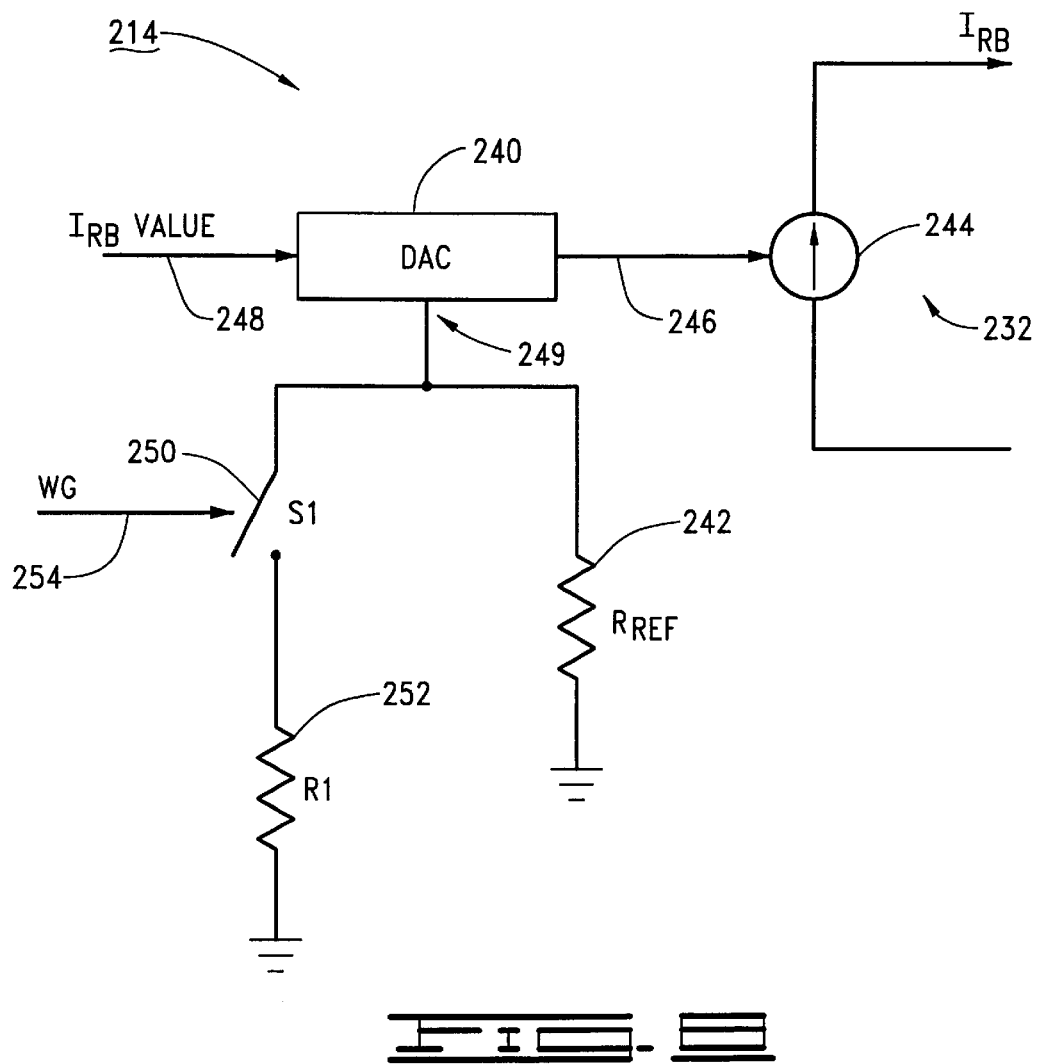
FIG. 8 is a functional block diagram of a read bias current source of the circuit of FIG. 7.
Figure 3:
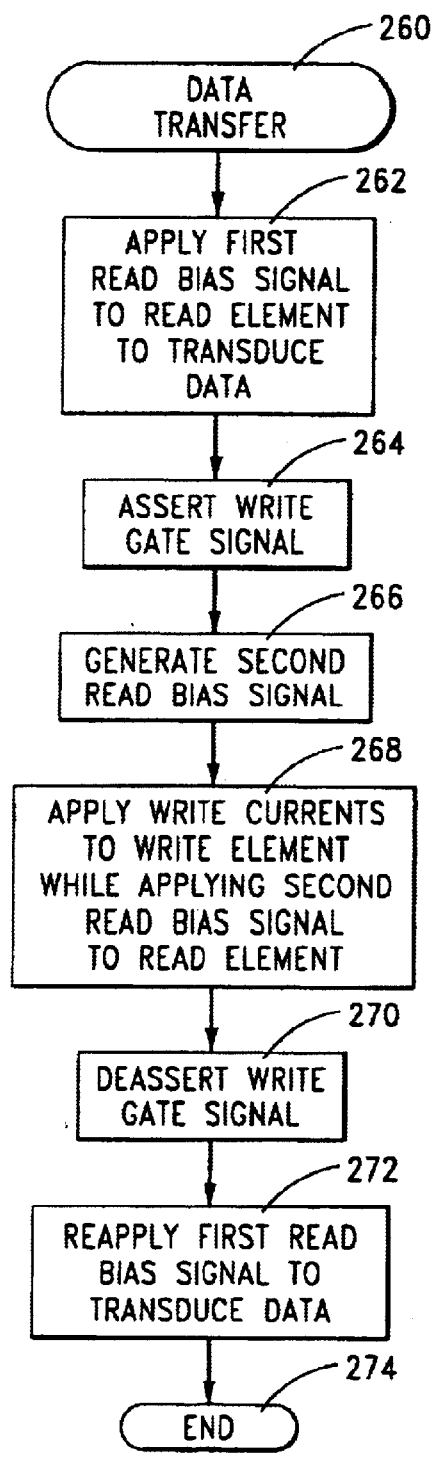

FIG. 8 provides a schematic diagram for a preferred construction for the read bias current source 214 of FIG. 7. The read bias current source 214 includes a digital to analog converter (DAC) 240, an external reference resistor ($R_{REF}$) 242, and a controllable current source 244. The DAC 240 is configured to output a current adjustment signal to the current source 244 on path 246 in response to an input digital bias current value on path 248 (from the buffer 210 of FIG. 7). The particular magnitude of the current adjustment signal from the DAC 240 is further set by the resistance sensed at an input terminal 249 of the DAC 240.

As shown in FIG. 8, the read bias current source 214 further includes a switch (S1) 250 and another external resistor (R1) 252. The S1 switch 250 and R1 resistor 252 are connected in parallel with the $R_{REF}$ resistor 242. The S1 switch 250 is normally open (NO), but closes upon assertion of the write gate signal 196 (on path 254). When the S1 switch 250 is closed, the R1 resistor 252 is switched in with the $R_{REF}$ resistor 242, adjusting the effective external resistance at the input terminal 249 of the DAC 240. The value of the R1 resistor 252 is selected to provide the desired adjustment in the read bias current magnitude (206, FIG. 6).

FIG. 9 provides a flow chart for a DATA TRANFER routine 260, indicative of steps carried out by the disc drive 100 in accordance with the foregoing discussion. At step 262, a first read bias signal of selected, nonzero magnitude is applied to the read element 166 to transduce data from the associated disc recording surface.

At step 264, a write gate signal is asserted in preparation of the writing of data to the recording surface. In response, the preamplifier operates to provide a second read bias signal of selected, nonzero magnitude different from the first read bias signal, as shown at step 266. The preamplifier then operates at step 268 to apply the second read bias signal to the read element 166 while applying write currents to the write element 164 to write data to the recording surface.

Once the writing operation of step 268 is completed, the write gate signal is deasserted, step 270, and the preamplifier reapplies the first read bias signal to the read element 166 to subsequently read data from the recording surface, step 272. The routine then ends at step 274.

Referring again to the preamplifier driver circuit diagram of FIG. 7, it will be noted that other approaches can be used to effect the adjustment of the read bias signal during the writing of data. For example, depending upon the configuration and operational capabilities of the preamplifier driver circuit 132, the DSP 152 could be configured to input new control words to the buffer 210 upon the assertion and deassertion of the write gate signal to implement the first and second read bias signal levels.

It will now be recognized that the present invention is directed to an apparatus and method for transferring data between a recording surface of a disc drive data handling system 100 and a host device.

In one aspect of the present invention, the disc drive data handling system comprises a disc 108 having a recording surface; a read/write head 118 having separate write and read elements 164, 166; a communication channel 142 which directs the transfer of data between the recording surface and a host device, the communication channel asserting a write gate signal in preparation of the writing of data; and a preamplifier driver circuit 132 coupled to the read/write head and to the communication channel.

The preamplifier driver circuit is configured to apply write currents to the write element to write data to the recording surface and to apply a first read bias signal of selected, nonzero magnitude to the read element to transduce data from the recording surface, wherein in response to the write gate signal, the preamplifier driver circuit generates a second read bias signal of selected, nonzero magnitude different from the magnitude of the first read bias signal and applies the second read bias signal to the read element while applying the write currents to the write element.

In another aspect of the present invention, the preamplifier driver circuit subsequently reapplies the first read bias signal to the read element to subsequently read data from the recording surface.

In another aspect of the present invention, the disc drive data handling system further comprises a servo circuit 148 operably coupled to the preamplifier driver circuit. The servo circuit 148 operates to control the position of the read/write head in response to servo data stored in servo data fields 136 on a track 134 on the recording surface. User data are written to user data fields 138 interspersed on the track between adjacent servo data fields. During a write operation in which user data are written to the user data fields, the preamplifier driver circuit applies the first read bias signal to the read element when the read/write head is disposed over the servo data fields, and applies the second read bias signal to the read element when the read/write head is disposed over the user data fields.

In yet another aspect of the present invention, the first and second read bias signals comprise first and second read bias currents, respectively.

In another aspect of the present invention, a method 260 is provided for transferring data comprising steps of applying a first read bias signal of selected, nonzero magnitude to a read element 166 to transduce data from a recording surface 108 (step 262). A write gate signal is asserted in preparation of writing data to the recording surface (step 264). The first read bias signal is next adjusted to provide a second read bias signal of selected, nonzero magnitude in response to the assertion of the write gate signal (step 266), and write currents are applied to the write element to write data to the recording surface while applying the second read bias signal to the read element (step 268).

In another aspect, the method further comprises steps of deasserting the write gate signal (step 270) and using the first read bias signal to subsequently transduce data from the recording surface (step 272).

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In a disc drive handling system having a recording surface and a read/write head comprising separate write and read elements, a method for transferring data between the recording surface and a host device comprising steps of:

(a) applying a first read bias signal of selected, nonzero magnitude to the read element to transduce data from the recording surface;

(b) asserting a write gate signal in preparation of writing data to the recording surface;

(c) updating the first read bias signal to provide a second read bias signal of selected, nonzero magnitude in response to the assertion of the write gate signal; and (d) applying write currents to the write element to write data to the recording surface while applying the second read bias signal to the read element.

2. The method of claim 1, further comprising steps of:

(e) deasserting the write gate signal; and (f) reapplying the first read bias signal to the read element to subsequently read data from the recording surface.

3. The method of claim 2, wherein the reapplying step (f) comprises reading the data previously written during the applying step (d).

4. The method of claim 2, wherein the data written during the applying step (d) are written to a user data field on the recording surface, and wherein the data read during the reapplying step (f) comprise servo data in a servo data field on the recording surface.

5. The method of claim 1, wherein the first and second read bias signals comprise first and second read bias currents, respectively.

6. The method of claim 5, wherein the updating step (c) comprises reducing the magnitude of the first read bias current to provide the second read bias current.

7. The method of claim 1, wherein the selected, nonzero magnitude of the second read bias signal is selected so that peak magnitudes of cross-talk noise induced in the second read bias signal from the write currents applied to the write element as a result of magnetic coupling between the write element and the read element do not exceed a maximum safe threshold signal level for the read element.

8. The method of claim 1, wherein the read element comprises a magneto-resistive (MR) read element.

9. A disc drive data handling system, comprising:

a recording surface;

a read/write head adjacent the recording surface and comprising separate write and read elements;

a communication channel which directs the transfer of data between the recording surface and a host device, the communication channel asserting a write gate signal in preparation of the writing of data; and a preamplifier driver circuit coupled to the read/write head and to the communication channel, the preamplifier driver circuit configured to apply write currents to the write element to write data to the recording surface and to apply a first read bias signal of selected, nonzero magnitude to the read element to transduce data from the recording surface, wherein in response to the write gate signal, the preamplifier driver circuit generates a second read bias signal of selected, nonzero magnitude different from the magnitude of the first read bias signal and applies the second read bias signal to the read element while applying the write currents to the write element.

10. The disc drive data handling system of claim 9, wherein the preamplifier driver circuit subsequently reapplies the first read bias signal to the read element to subsequently read data from the recording surface.

11. The disc drive data handling system of claim 9, further comprising a servo circuit operably coupled to the preamplifier driver circuit which operates to control the position of the read/write head in response to servo data stored in servo data fields on a track on the recording surface, wherein user data are written to user data fields interspersed on the track between adjacent servo data fields, and wherein during a write operation in which user data are written to the user data fields the preamplifier driver circuit applies the first read bias signal to the read element when the read/write head is disposed over the servo data fields, and applies the second read bias signal to the read element when the read/write head is disposed over the user data fields.

12. The disc drive data handling system of claim 9, wherein the first and second read bias signals comprise first and second read bias currents, respectively.

13. The disc drive data handling system of claim 12, wherein the preamplifier driver circuit reduces the magnitude of the first read bias current to provide the second read bias current.

14. The disc drive data handling system of claim 12, wherein the preamplifier driver circuit comprises a read bias current source circuit comprising:

- a current source which controllably generates the first and second read bias currents;
- a first external resistor having a selected resistance;
- a digital to analog converter which outputs an analog current adjustment signal to the current source in response to an input digital value and an external resistance sensed at an input terminal of the digital to analog converter;
- a switch responsive to the write gate signal; and
- a second external resistor having a selected resistance and operably coupled to the switch and the external resistor so that, when the write gate signal is deasserted, the digital to analog converter senses the selected resistance of the first external resistor at the input terminal, and when the write gate signal is asserted, the digital to analog converter senses the combined resistance of the first and second external resistors at the input terminal.

15. A disc drive data handling system, comprising:

- a recording surface;
- a read/write head adjacent the recording surface and comprising separate write and read elements, wherein data are written to the recording surface by the application of write currents to the write element, and wherein data are read from the recording surface by the application of a first read bias signal of selected, nonzero magnitude to the read element;
- a communication channel which directs the transfer of data between the recording surface and a host device, the communication channel asserting a write gate signal in preparation of the writing of data; and
- first means responsive to the assertion of the write gate signal for adjusting the first read bias signal to provide a second read bias signal of selected, nonzero magnitude different from the first read bias signal, and for applying the second read bias signal to the read element while applying the write currents to the write element.

16. The data handling system of claim 15, wherein the first means comprises a preamplifier driver circuit operably coupled to the read/write head and to the communication channel.

17. The data handling system of claim 15, wherein the first and second read bias signals comprise first and second read bias currents, respectively.

18. The disc drive data handling system of claim 15, wherein the first means selects the selected, nonzero magnitude of the second read bias signal so that peak magnitudes of cross-talk noise induced in the second read bias signal from the write currents applied to the write element as a result of magnetic coupling between the write element and the read element do not exceed a maximum safe threshold signal level for the read element.

* * * * *